(12) United States Patent
Swanburg et al.

(10) Patent No.: US 8,943,018 B2
(45) Date of Patent: Jan. 27, 2015

(54) ADVANCED CONTACT MANAGEMENT IN COMMUNICATIONS NETWORKS

(75) Inventors: Scott Swanburg, Duluth, GA (US); Andre Okada, Seattle, WA (US); Paul Hanson, Kirkland, WA (US); Chris Young, Roswell, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 1104 days.

(21) Appl. No.: 11/873,031

(22) Filed: Oct. 16, 2007

(65) Prior Publication Data

US 2008/0235242 A1    Sep. 25, 2008

Related U.S. Application Data

(60) Provisional application No. 60/896,728, filed on Mar. 23, 2007.

(51) Int. Cl.
*G06F 7/00* (2006.01)
*G06F 17/00* (2006.01)
(Continued)

(52) U.S. Cl.
CPC ... *H04M 1/274516* (2013.01); *H04L 29/12047* (2013.01); *H04L 29/12122* (2013.01); *H04L 29/12132* (2013.01); *H04L 61/1547* (2013.01); *H04L 61/1552* (2013.01); *H04L 61/1594* (2013.01); *H04M 1/72572* (2013.01); *H04L 51/28* (2013.01); *H04L 67/1095* (2013.01);
(Continued)

(58) Field of Classification Search
None
See application file for complete search history.

(56) References Cited

U.S. PATENT DOCUMENTS 5,692,032 A    11/1997    Seppanen et al.
5,894,506 A    4/1999    Pinter
(Continued)

FOREIGN PATENT DOCUMENTS

EP    1359777    11/2003
EP    1569426    8/2005
(Continued)

OTHER PUBLICATIONS

L. Pearlman, A Community Authorization Service for Group Collaboration, Jun. 2002, IEEE 3rd international Workshop, pp. 50-59.*
(Continued)

*Primary Examiner* — Taelor Kim
(74) *Attorney, Agent, or Firm* — Hartman & Citrin LLC

(57) ABSTRACT

A system provided herein permits a communications network subscriber to establish a local contact database on at least one communications device. The local contact database can communicate with a global contact database to receive contact information updates for a group of subscribers stored within the local contact database. The contact information can include basic contact information, such as name, address, email address, and telephone number. The contact information can also include advanced contact information, such as registration and activity information for each communications device associated with the group of subscribers, location information, hotspot information, points of interest information, and social networking information. Methods are provided herein that permit subscribers to introduce each other and obtain contact information securely. Methods are also provided herein that permit subscribers to request further contact information after a communication session is terminated.

15 Claims, 11 Drawing Sheets

(51) Int. Cl.
*G06F 17/30* (2006.01)
*H04M 1/2745* (2006.01)
*H04L 29/12* (2006.01)
*H04M 1/725* (2006.01)
*H04L 12/58* (2006.01)
*H04L 29/08* (2006.01)
*H04M 3/42* (2006.01)

(52) U.S. Cl.
CPC ....... *H04L 29/12169* (2013.01); *H04L 61/1576* (2013.01); *H04M 1/274508* (2013.01); *H04M 3/42382* (2013.01); *H04M 2203/2011* (2013.01); *H04M 2250/10* (2013.01); *H04L 51/14* (2013.01)
USPC ........................... 707/610; 707/661; 707/737

(56) References Cited

U.S. PATENT DOCUMENTS

| | | | |
|---|---|---|---|
| 5,905,959 | A | 5/1999 | Foladare et al. |
| 5,943,399 | A | 8/1999 | Bannister et al. |
| 6,044,275 | A | 3/2000 | Boltz et al. |
| 6,085,201 | A | 7/2000 | Tso |
| 6,138,008 | A | 10/2000 | Dunn et al. |
| 6,182,059 | B1 | 1/2001 | Angotti et al. |
| 6,278,968 | B1 | 8/2001 | Franz et al. |
| 6,356,633 | B1 | 3/2002 | Armstrong |
| 6,393,421 | B1* | 5/2002 | Paglin .................................. 1/1 |
| 6,411,947 | B1 | 6/2002 | Rice et al. |
| 6,477,551 | B1 | 11/2002 | Johnson et al. |
| 6,480,484 | B2 | 11/2002 | Morton |
| 6,522,877 | B1 | 2/2003 | Lietsalmi et al. |
| 6,718,368 | B1 | 4/2004 | Ayyadurai |
| 7,058,652 | B2 | 6/2006 | Czarnecki et al. |
| 7,137,070 | B2 | 11/2006 | Brown et al. |
| 7,149,782 | B2 | 12/2006 | Sommerer |
| 7,383,250 | B2 | 6/2008 | Scian et al. |
| 7,546,131 | B1 | 6/2009 | Sidi et al. |
| 7,657,600 | B2 | 2/2010 | Auhagen |
| 7,844,666 | B2 | 11/2010 | Horvitz et al. |
| 7,925,620 | B1* | 4/2011 | Yoon .............................. 707/609 |
| 8,069,143 | B2 | 11/2011 | Swanburg et al. |
| 2001/0041566 | A1 | 11/2001 | Xanthos et al. |
| 2002/0007346 | A1* | 1/2002 | Qiu et al. ........................ 705/50 |
| 2002/0035684 | A1* | 3/2002 | Vogel et al. .................... 713/155 |
| 2002/0138582 | A1 | 9/2002 | Chandra et al. |
| 2002/0169841 | A1 | 11/2002 | Carlson et al. |
| 2002/0178041 | A1 | 11/2002 | Krantz et al. |
| 2003/0154256 | A1 | 8/2003 | Hadano et al. |
| 2003/0193951 | A1 | 10/2003 | Fenton et al. |
| 2004/0059700 | A1 | 3/2004 | Park et al. |
| 2004/0128151 | A1 | 7/2004 | Mock et al. |
| 2004/0208297 | A1 | 10/2004 | Valentine |
| 2005/0021551 | A1* | 1/2005 | Silva et al. .................... 707/102 |
| 2005/0074169 | A1 | 4/2005 | Filatov et al. |
| 2005/0120084 | A1 | 6/2005 | Hu et al. |
| 2005/0198582 | A1 | 9/2005 | Hennum et al. |
| 2005/0209861 | A1 | 9/2005 | Hewes et al. |
| 2006/0030297 | A1 | 2/2006 | Coble et al. |
| 2006/0052091 | A1 | 3/2006 | Onyon et al. |
| 2006/0095575 | A1 | 5/2006 | Sureka et al. |
| 2006/0104429 | A1 | 5/2006 | Wouterse et al. |
| 2006/0115062 | A1 | 6/2006 | Gonder et al. |
| 2006/0246881 | A1 | 11/2006 | Winkler et al. |
| 2006/0250987 | A1 | 11/2006 | White et al. |
| 2006/0274721 | A1 | 12/2006 | Flanagan |
| 2006/0277176 | A1 | 12/2006 | Liao |
| 2007/0022099 | A1 | 1/2007 | Yoshimura et al. |
| 2007/0026852 | A1 | 2/2007 | Logan et al. |
| 2007/0064920 | A1 | 3/2007 | Ruckart |
| 2007/0073810 | A1 | 3/2007 | Adams et al. |
| 2007/0088798 | A1 | 4/2007 | Merrill et al. |
| 2007/0136431 | A1 | 6/2007 | Sun |
| 2007/0233736 | A1 | 10/2007 | Xiong et al. |
| 2007/0249379 | A1 | 10/2007 | Bantukul |
| 2007/0266118 | A1* | 11/2007 | Wilkins .......................... 709/219 |
| 2007/0266156 | A1* | 11/2007 | Wilkins .......................... 709/225 |
| 2008/0004005 | A1 | 1/2008 | Jensen |
| 2008/0133677 | A1* | 6/2008 | Pattabhiraman et al. ...... 709/206 |
| 2008/0189293 | A1* | 8/2008 | Strandel et al. ................. 707/10 |
| 2008/0250332 | A1* | 10/2008 | Farrell et al. ................... 715/753 |
| 2008/0300982 | A1 | 12/2008 | Larson et al. |
| 2009/0022285 | A1 | 1/2009 | Swanburg et al. |
| 2009/0285129 | A1 | 11/2009 | Swanburg et al. |
| 2010/0179991 | A1 | 7/2010 | Lorch et al. |
| 2010/0287241 | A1 | 11/2010 | Swanburg et al. |
| 2012/0066177 | A1 | 3/2012 | Swanburg et al. |

FOREIGN PATENT DOCUMENTS

| | | |
|---|---|---|
| EP | 1755294 | 2/2007 |
| WO | 9949679 | 9/1999 |
| WO | 02087197 | 10/2002 |
| WO | 2005015927 | 2/2005 |
| WO | 2008118878 | 10/2008 |

OTHER PUBLICATIONS

U.S. Office Action dated Jul. 16, 2010 in U.S. Appl. No. 12/051,336.
U.S. Office Action dated Dec. 27, 2010 in U.S. Appl. No. 12/051,336.
U.S. Notice of Allowance dated Jul. 15, 2011 in U.S. Appl. No. 12/051,336.
U.S. Office Action dated Sep. 21, 2011 in U.S. Appl. No. 12/053,525.
U.S. Office Action dated Aug. 6, 2012 in U.S. Appl. No. 12/053,525.
U.S. Office Action dated Dec. 23, 2010 in U.S. Appl. No. 12/279,756.
U.S. Office Action dated Jul. 8, 2011 in U.S. Appl. No. 12/279,756.
U.S. Office Action dated Sep. 15, 2010 in U.S. Appl. No. 12/053,512.
U.S. Office Action dated Mar. 1, 2011 in U.S. Appl. No. 12/053,512.
U.S. Office Action dated Jul. 6, 2011 in U.S. Appl. No. 12/053,512.
U.S. Office Action dated Feb. 9, 2012 in U.S. Appl. No. 12/053,512.
U.S. Office Action dated Oct. 12, 2012 in U.S. Appl. No. 12/053,512.
"3rd Generation Partnership Project; Technical Specification Group Services and System Aspects; Support of SMS and MMS Over Generic 3GPP IP Access," 3GPP TR 23.804 v7.1.0 (Sep. 2005).
U.S. Appl. No. 12/279,756 Office Action dated Sep. 11, 2013.
U.S. Appl. No. 13/296,374 Office Action dated Nov. 25, 2013.
U.S. Appl. No. 12/053,525 Notice of Allowance dated Mar. 6, 2014.
U.S. Appl. No. 12/279,456 Office Action dated Apr. 8, 2014.
International Application No. PCT/US2008/058052 Written Opinion dated Sep. 29, 2009.
International Application No. PCT/US2008/058052 International Search Report dated Oct. 7, 2008.
International Application No. PCT/US2008/058055 Written Opinion dated Sep. 29, 2009.
International Application No. PCT/US2008/058055 International Search Report dated Jul. 3, 2009.
International Application No. PCT/US2008/058057 Written Opinion dated Sep. 29, 2009.
International Application No. PCT/US2008/058057 International Search Report dated Jul. 7, 2008.
International Application No. PCT/US2008/058064 Written dated Sep. 29, 2009.
International Application No. PCT/US2008/058064 International Search Report dated Aug. 21, 2008.
International Application No. PCT/US2008/058067 Written Opinion dated Sep. 29, 2009.
International Application No. PCT/US2008/058067 International Search Report dated Oct. 27, 2008.
U.S. Office Action dated Oct. 21, 2014 in U.S. Appl. No. 12/279,756.

* cited by examiner

ADVANCED CONTACT MANAGEMENT IN COMMUNICATIONS NETWORKS

CROSS-REFERENCE TO RELATED APPLICATIONS

This application claims priority to U.S. Provisional Application No. 60/896,728, filed Mar. 23, 2007, the entirety of which is incorporated by reference herein.

TECHNICAL FIELD

The present invention relates generally to systems and methods for providing contact information on communications devices and, more particularly, to advanced systems and methods for managing contact information in communications networks and providing contact information to communications devices.

BACKGROUND

Mobile communications devices, such as cellular telephones, include memory to store contact information. This contact information is typically arranged in an address book (also known as a contact list) and can include name, address information, telephone numbers, and email addresses. Many of these address book systems offer features such as speed dial, voice dial, custom ringtones, and images to enhance the look and user experience of the address book. Address book options allow for various communication methods including voice call, messaging, and email.

Many users have multiple address books associated with multiple devices. For example, a user may have an address book for one or more mobile communications devices, home computers, work computers, and game systems. Often, many of the contacts are on multiple address books and the user is burdened with the task of entering and maintaining contact information for each contact in each of the address books, a redundant task that is both time consuming and tedious.

Software has been developed that allows two devices to be synchronized to establish a common address book. This is particularly beneficial for business professionals that use email applications to store contacts for their clients and other important contacts. The business professional may also have a mobile device, such as a smart phone, that combines traditional cellular telephone functions and personal digital assistant (PDA) functions in a single device. Synchronizing the contacts on the computer and on the smart phone ensures that the appropriate contact information is available whenever the professional is using either device. This also eliminates having to enter the same contact information into multiple devices.

People are constantly finding different ways to communicate and network, both socially and professionally. The Internet has made communication easily accessible via email and instant messaging applications. In recent years, networking websites have become popular and are becoming increasingly so. These websites allow people to share information and find others that share similar interests. Networking naturally increases the number of contacts a particular individual may have, thus, increasing the number of address book entries a contact needs to enter on each device they wish to store the entry.

Databases that include both business and residential telephone and address information have been around for years. These databases are often searchable via the Internet and published in the form of a telephone book. Customers can request that their information be withdrawn from the database and not published in any such publication. Wireless telephone service subscribers are generally not published in the United States unless the subscriber specifically requests that the number be published.

The aforementioned art includes deficiencies that are overcome by the new systems and novel methods disclosed herein. The applicant desires to create a need and market for these new systems and novel methods that provide search, handshake, introduction, and other new advanced functions to a contact list. Further, these new systems and novel methods provide a global contact database that is searchable by users to obtain contact information for a subscriber without compromising the security and confidentiality of the subscriber's information. Still further, these new systems and novel methods provide advanced address book information through the addition of user-defined and pre-established points of interest to a mobile address book.

SUMMARY

One aspect of the present invention is a system for providing contact information to a plurality of subscribers in a communications network via communications devices. The system includes a global contact database (GCD), an auxiliary contact database (ACD), and at least a first communications device and a second communications device. The GCD is configured to store basic contact information, such as, for example, name, address, email address and telephone number for each of the subscribers. The ACD is in communication with the GCD and is configured to receive advanced contact information for at least one of the subscribers from at least one data source and provide the advanced contact information to the GCD upon receipt of a request from the GCD. The first communications device is in communication with the GCD and is associated with a first subscriber. The first communications device includes a first local contact database (LCD) configured to store contact information, received from the GCD or ACD, for a first subset of the subscribers. The second communications device is in communication with the GCD and is associated with a second subscriber. The second communications device includes a second LCD configured to store contact information, received from the GCD or ACD, for a second subset of the subscribers. The first subset includes the contact information for the second subscriber and the second subset includes the contact information for the first subscriber.

In one embodiment of the aforementioned system, the contact information includes a registration status and an active status for each of the communications devices. In another embodiment, the contact information includes location information. In yet another embodiment, the contact information includes hot spot identification information. In still another embodiment, the contact information includes personal contact point information. In another embodiment, the contact information includes social networking information. In another embodiment, the contact information includes group association information. In another embodiment, the contact information includes private and public contact information.

Another aspect of the present invention is a system for providing contact information in a communications network via communications devices, the system includes a global contact database (GCD), a first communications device, a second communications device, and a third communications device. The GCD is configured to store contact information for a plurality of subscribers. The first communications device is associated with a first subscriber and is configured to store a first local contact database (LCD). The first communications device is in communication with the GCD. The first LCD includes contact information that is associated with each subscriber of a first subset of subscribers. The second communications device is associated with a second subscriber and is configured to store a second LCD. The second communications device is in communication with the GCD. The second LCD includes contact information that is associated with each subscriber of a second subset of subscribers. The third communications device is associated with a third subscriber and is configured to store a third LCD. The third communications device is in communication with the GCD. The third LCD includes contact information associated with each subscriber of a third subset of subscribers. The first subset includes contact information for the second subscriber and the second subset includes contact information for the first subscriber and the third subscriber. The second communications device establishes a data session with the first communications device. The data session provides the first subscriber temporary access to the contact information for the third subscriber.

In one embodiment of the aforementioned system, the data session is established upon authorization from the third subscriber. In another embodiment, the first subscriber is provided an option on the first communications device to accept or reject the contact information for the third subscriber. If the option is accepted, the third subscriber's contact information is stored in the first LCD. In yet another embodiment, the second communications device is configured to send an introduction message to the first communication device, said introduction message being used to establish said data session pending authorization by at least one of said first subscriber and said third subscriber.

Another aspect of the present invention is a method for providing contact information in a communications network via communications devices. The method includes establishing a data session between a first communications device and a second communications device. The first communications device is associated with a first subscriber and the second communications device is associated with a second subscriber. The first communications device includes a first local contact database (LCD) and the second communications device includes a second LCD. The first LCD includes contact information for a first group of subscribers and the second LCD includes contact information for a second group of subscribers. The first group of subscribers includes the second subscriber and the second group of subscribers includes the first subscriber. The data session provides the first communications device with temporary access to contact information associated with at least one subscriber stored in the second LCD that is not stored in the first LCD.

Yet another aspect of the present invention is a method for providing contact information in a communications network via communications devices. The method includes establishing a communication session between a first communications device and a second communications device. The first communications device is associated with a first subscriber and the second communications device is associated with a second subscriber. The first communications device includes a first local contact database (LCD) and the second communications device includes a second LCD. The first LCD includes contact information for a first group of subscribers not including the second subscriber. The second LCD includes contact information for a second group of subscribers not including the first subscriber. The method further includes terminating the communication session and, in response to terminating the communication session, providing a first option to the first subscriber on the first communications device. The first option permits the first subscriber to request contact information for the second subscriber. The method further includes receiving a request for the second subscriber's contact information and providing the second subscriber's contact information to the first communication device for storage in the first LCD.

One embodiment of the aforementioned method further includes providing a second option to the second subscriber on the second communications device. The second option permits the second subscriber to request contact information for the first subscriber. In this embodiment the method further includes receiving a request for the first subscriber's contact information and providing the first subscriber's contact information to the second communications device for storage in the second LCD.

Another aspect of the present invention is a method for providing contact database search functions in a communications network via communications devices. The method includes receiving a search request from a communications device at a global contact database (GCD). The GCD is configured to store contact information for a plurality of subscribers. The method further includes searching the GCD for contact information that corresponds to the search request; compiling search results from the searching step; and determining a policy setting for each subscriber associated with the search results. The policy setting is one of a public setting and a private setting. The method further includes sending the search results with the policy setting for each subscriber to the communications device. If the policy setting is public, the communications device is permitted to store available contact information for the corresponding subscriber. However, if the policy setting is private, the communications device is permitted to generate and send a request for further contact information for the corresponding subscriber.

In one embodiment of the aforementioned method, the request includes a message that is sent to the GCD. In another embodiment, the method further includes receiving the message; generating a message response including the further contact information for the subject corresponding subscriber; and sending the message response to the communications device. The communications device can store the contact information in a local contact database associated with the communications device.

In yet another embodiment of the aforementioned method the request includes a message sent to a second communications device associated with the subject corresponding subscriber. In another embodiment, the method further includes receiving the message at the second communications device; generating a message response including the further contact information for the subject corresponding subscriber; and sending the message response to the communications device. The communications device can store the contact information in a local contact database associated with the communications device.

DETAILED DESCRIPTION

As required, detailed embodiments of the present invention are disclosed herein. It must be understood that the disclosed embodiments are merely exemplary examples of the invention that may be embodied in various and alternative forms, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, well-known components, systems, materials or methods have not been described in detail in order to avoid obscuring the present invention. Therefore, specific structural and functional details disclosed herein are not to be interpreted as limiting, but merely as a basis for the claims and as a representative basis for teaching one skilled in the art to variously employ the present invention.

Figure 1:
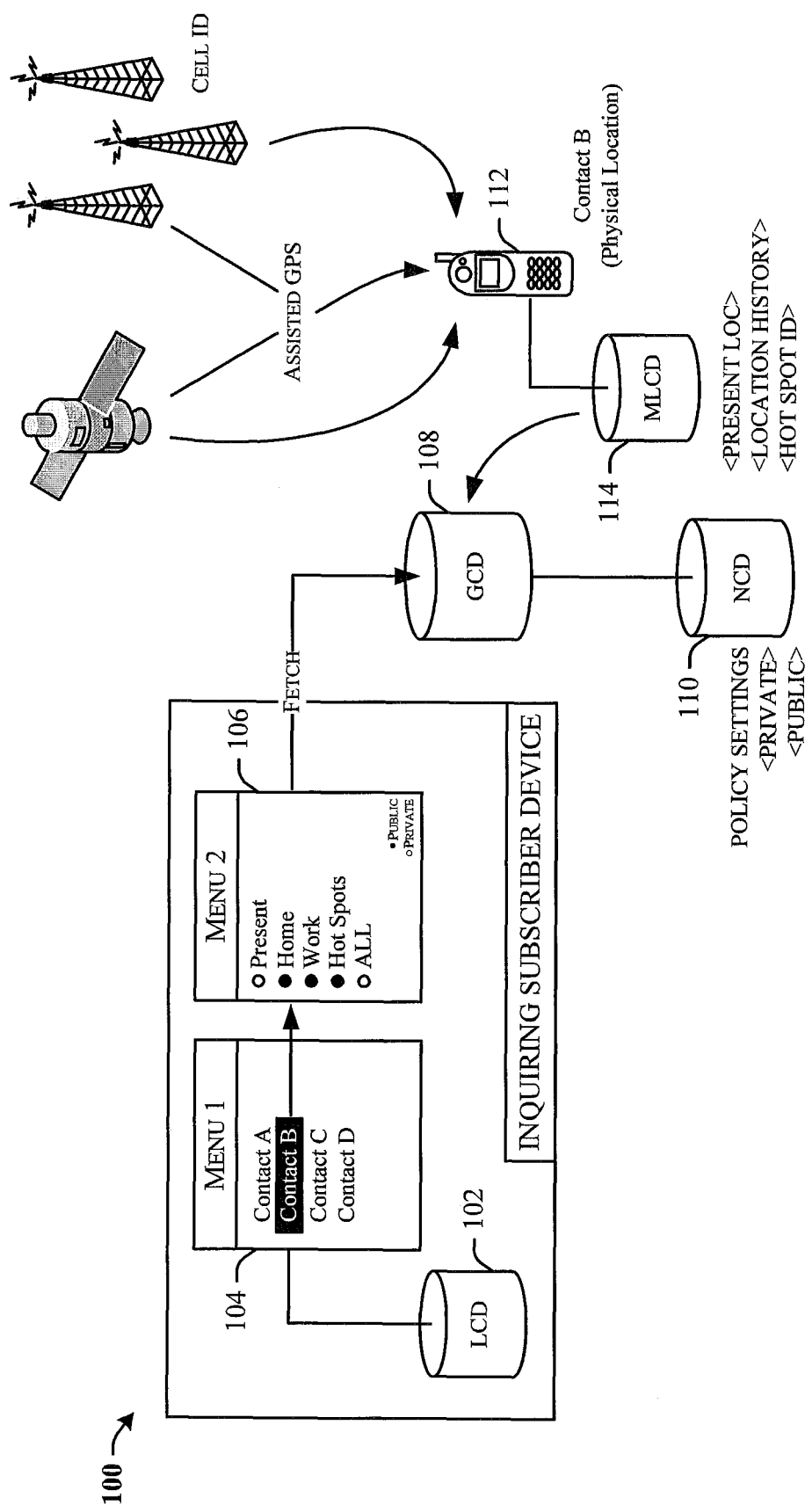
FIG. 1 is a block diagram illustrating a system for the collection of data pertaining to a physical location of an individual during a contact system "search" function, according to the present invention.
Figure 11:
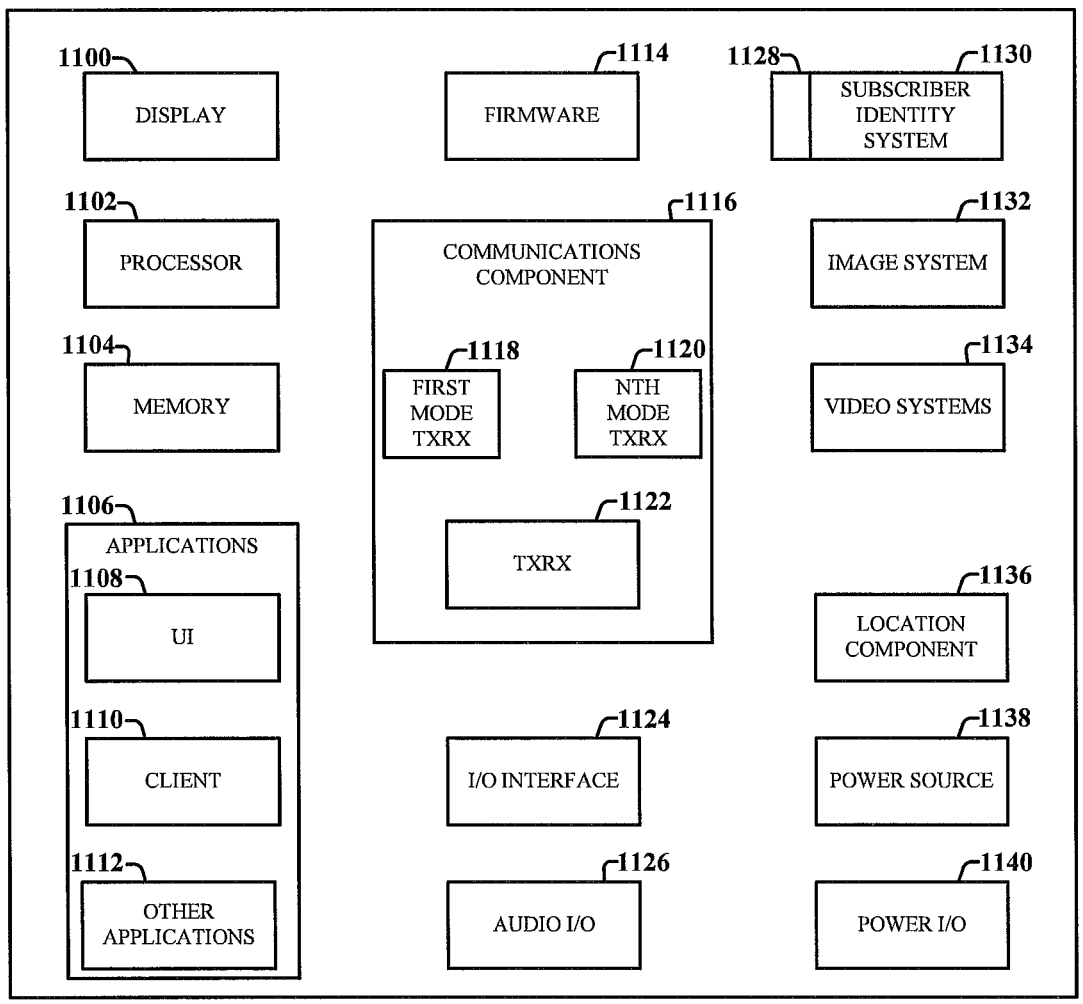
FIG. 11 illustrates an exemplary mobile device and components thereof, according to the present invention.

Referring now to the drawings wherein like numerals represent like elements throughout the several views, FIG. 1 illustrates a system for the collection of data pertaining to a physical location of an individual during a contact system search function. When such a search function is invoked by an inquiring subscriber, a series of events is triggered. In order to expedite the request and optimize the use of network resources, a local search is first conducted on an inquiring subscriber device 100. The device can be, but is not limited to, a computer, a PDA, a cellular telephone or other mobile communications device, an IP television, a set-top box, a game system, and the like. The subscriber device 100 can include one or more computer program modules. As used herein, the term "module" refers to computer program logic and/or any hardware or circuitry utilized to provide the functionality attributed to the module. Thus, a module can be implemented in hardware, firmware, and/or software. Accordingly, a memory module (not shown) can be configured to store a local contact database (LCD) 102 containing a plurality of contacts. A contact database is also referred to herein as an address book. The memory module can also include operating system (OS) software such as, for example, SYMBIAN, WINDOWS MOBILE, PALM OS, BLACK-BERRY OS, LINUX, JAVAFX, other embedded OS, line-based OS, or graphical user interface (GUI)-based OS. Application software can also be stored in the memory module. An exemplary mobile device and components thereof is illustrated in FIG. 11.

An exemplary contact list is illustrated in a first GUI menu 104. The contact list is generated from the contacts available in the LCD 102. The illustrated contact list includes Contact A, Contact B, Contact C, and Contact D, however, any number of contacts can be displayed in the first GUI menu 104. Contact B is selected as indicated by the black surround. A second GUI menu 106 illustrates the <private> and <public> attributes associated with the selected contact. As illustrated, Contact B has elected Home, Work, and Hot Spots to be public and each are associated with a <public> tag. Likewise, Contact B has made Present location private and as such Present is associated with a <private> tag. The <public> and <private> attributes can be stored in the LCD 102. In the illustrated example, the inquiring subscriber does not have permission to access Contact B's private information. Contact B, as will be explained in greater detail below, can change the access privileges for any known contact and accordingly vary the amount and type of information that is available for the inquiring subscriber to view.

The subscriber device 100 can be in communication with a global contact database (GCD) 108. The GCD 108 can be located within a service provider's network and can, in turn, be in communication with location databases, location servers, billing nodes, and the like. For purposes of explanation and not limitation, the GCD 108 will be described as having the same contacts as illustrated in the first GUI menu 104 and the inquiring subscriber; however, the GCD 108 can be configured to support any number of contacts. In addition, the GCD 108 is described as being a network node on a single service provider's network; however, the GCD 108 can be shared with other service provider's network as a third party service, for example. Alternatively, a service provider may establish an agreement with one or more service providers to offer GCD 108 based services.

The GCD 108 is also illustrated as being in communication with a network contact database (NCD) 110. An NCD 110 can be created and maintained for each contact in the GCD 108. In the illustrated embodiment, for example, an NCD can be established for Contact A, Contact B, Contact C, and Contact D. The NCD 110 is configured to store policy settings for the locations available for a particular subscriber, for example, Contact B. The policy settings can be the <private> and <public> attributes, for example. Other attributes, such as a subscriber's favorite locations, likes, dislikes, and similar information can also be stored in association with the subscriber in the NCD 110. The NCD 110 is illustrated as a separate network node, however, it should be understood that the NCD 110 can be integrated with the GCD 108. For example, the NCD 110 can be realized by one or more optional database entry fields within the GCD 108.

The features described herein can be offered as a free service or as a pay service. The service can be included in certain service plans or billed as a monthly add-on to a base service plan. The following description assumes that the subscriber device 100 user is subscribed to the service. The service can be a wireless service, such as a cellular-based wireless voice and data service, WIFI, voice over Internet protocol (VoIP) over WIFI, or a landline service, such as landline telephone service, cable or satellite television and/or Internet access service, IP television service, digital subscriber line (DSL) Internet access service, and the like.

Although applicable to any existing or yet to be developed wireless telecommunications network, aspects of the disclosed architecture can be implemented using global system for mobile communications (GSM) that uses general packet radio service (GPRS) as an enabling bearer. Examples of other suitable wireless and radio frequency data transmission systems include networks utilizing time division multiple access (TDMA), frequency division multiple access (FDMA), wideband code division multiple access (WCDMA), orthogonal frequency division multiplexing (OFDM), and various other 2.5G and 3G (third generation) and above wireless communications systems. Examples of other suitable enabling bearers include universal mobile telecommunications system (UMTS), enhanced data rates for global evolution (EDGE), high speed downlink packet access (HSDPA), and similar communications protocols.

The GCD 108 can be configured to automatically update the subscriber's LCD 102. The update can be at any time. For example, the update can be hourly, daily, weekly, monthly, yearly, or any incremental time value thereof. In an exemplary embodiment, the updates occur automatically during off-peak hours. For location updates, the GCD 108 can be updated each time a new location is received for a specific contact. A user may alternatively request a manual update, for example, by a hard key or soft key programmed to establish a data session with the GCD 108 to retrieve any updated information for one or more contacts.

Location information for updating the various databases can be acquired from cell IDs stored within location databases (not shown), global positioning system (GPS) coordinates, and assisted GPS, for example. The present location can be tracked by the network (e.g., stored in a location database) and/or stored on the contact's device 112 (in this example Contact B) in a mobile LCD (MLCD) 114. The MLCD 114 can additionally include location history (not shown) that can be viewed by the inquiring subscriber in the second GUI menu 106. The contact can also establish hot spots that can be stored in the MLCD 114.

The MLCD 114 can send updated location information, hot spot information, policy settings, and the like to the GCD 108 automatically or manually via methods described above for retrieval of updated location information for the subscriber device 100. Hot spots and other points of interest (POIs) are discussed in greater detail with reference to FIG. 3.

Contact B has a database entry in the GCD 108 with preferences and privacy settings set in accordance with his or her and/or the serving network's specifications. Privacy settings, in the form of attribute tags for <private> and <public> attributes are used to describe each of the discrete data points for Contact B. For example, general personality traits or interests, such as "likes to ski" or "likes to scuba dive" can be assigned a <public> attribute tag to allow access to other individuals or subscribers stored within the GDC 108. That is, a <public> attribute can be accessed and viewed by other GDC 108 subscribers. Other private information, such as home address and work address can be assigned a <private> attribute tag to allow access only to so-called "trusted" subscribers stored within the GDC 108. The <public> and <private> attributes are described in greater detail with reference to FIG. 4, wherein these attributes are described further in their relation to an introduction aspect of the present invention.

Figure 2:
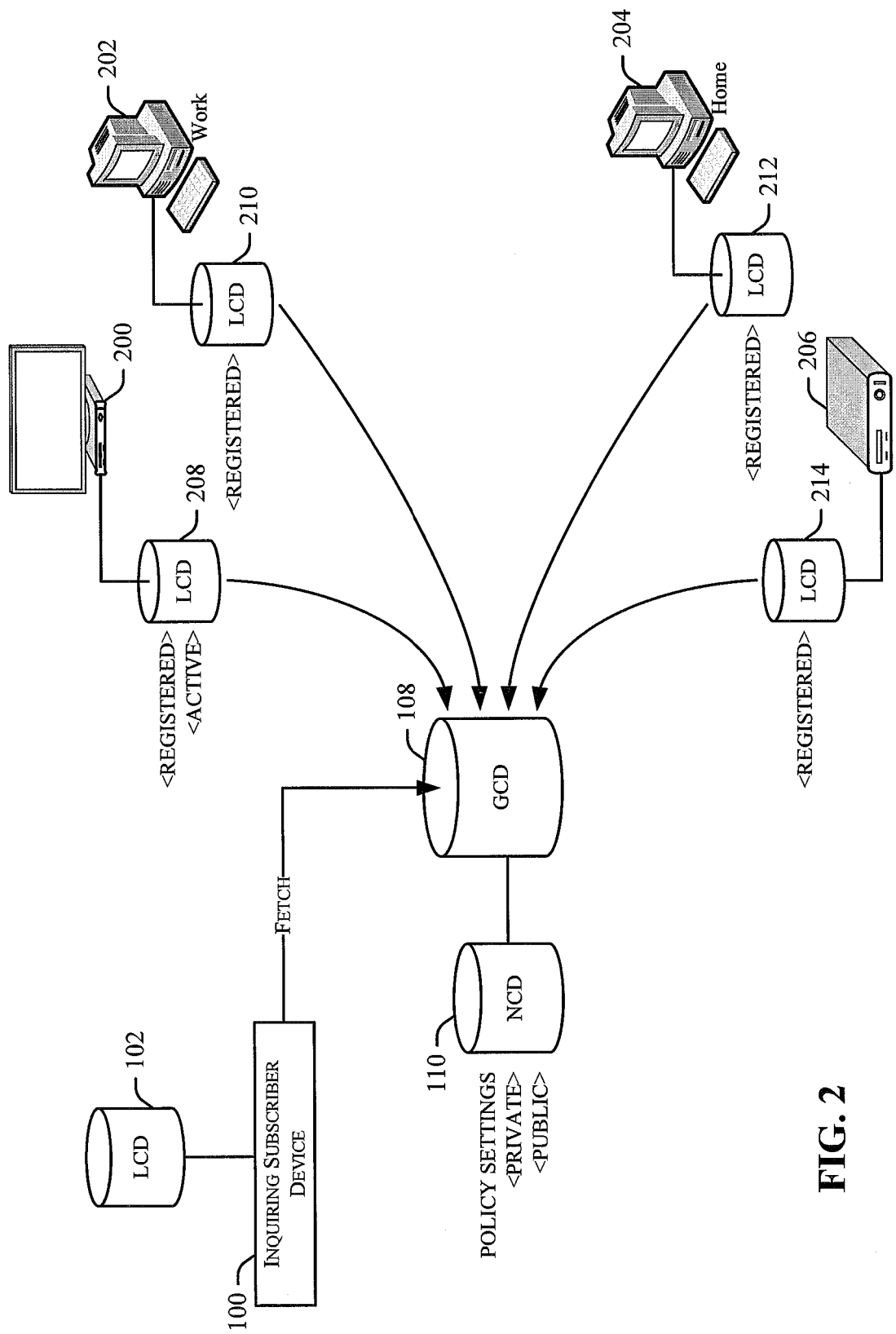
FIG. 2 is a block diagram illustrating a plurality of devices in communication with a global contact database, according to the present invention.

FIG. 2 illustrates a plurality of devices, namely a set-top box (STB) 200, a work computer 202, a home computer 204, and a game system 206. Each of the illustrated devices includes a local contact database (LCD) 208, 210, 212, 214, respectively, to store local contacts and, <registered> and <active> attributes. Currently, as illustrated, the STB 200 is registered and is the active device. That is, the requested contact (e.g., Contact B) is using or is logged in to the STB 200. Each of the other devices are <registered> devices, meaning that the LCDs 208, 210, 212, 214 and the MLCD 114 (FIG. 1) are all are registered contact databases and are linked via the <registered> status. All of the LCDs 208, 210, 212, 214, 114 are in communication with the GCD 108 to update <active> and <registered> attributes and contact information with the GCD 108. The GCD 108 can then update the LCD 102 with the new <active> devices. The inquiring subscriber could then see which device is the active device for a particular contact. Accordingly, under the first GUI menu 104 or another menu, an icon or other identification can be used to notify the inquiring subscriber of the active device for each contact, if available.

Figure 3:
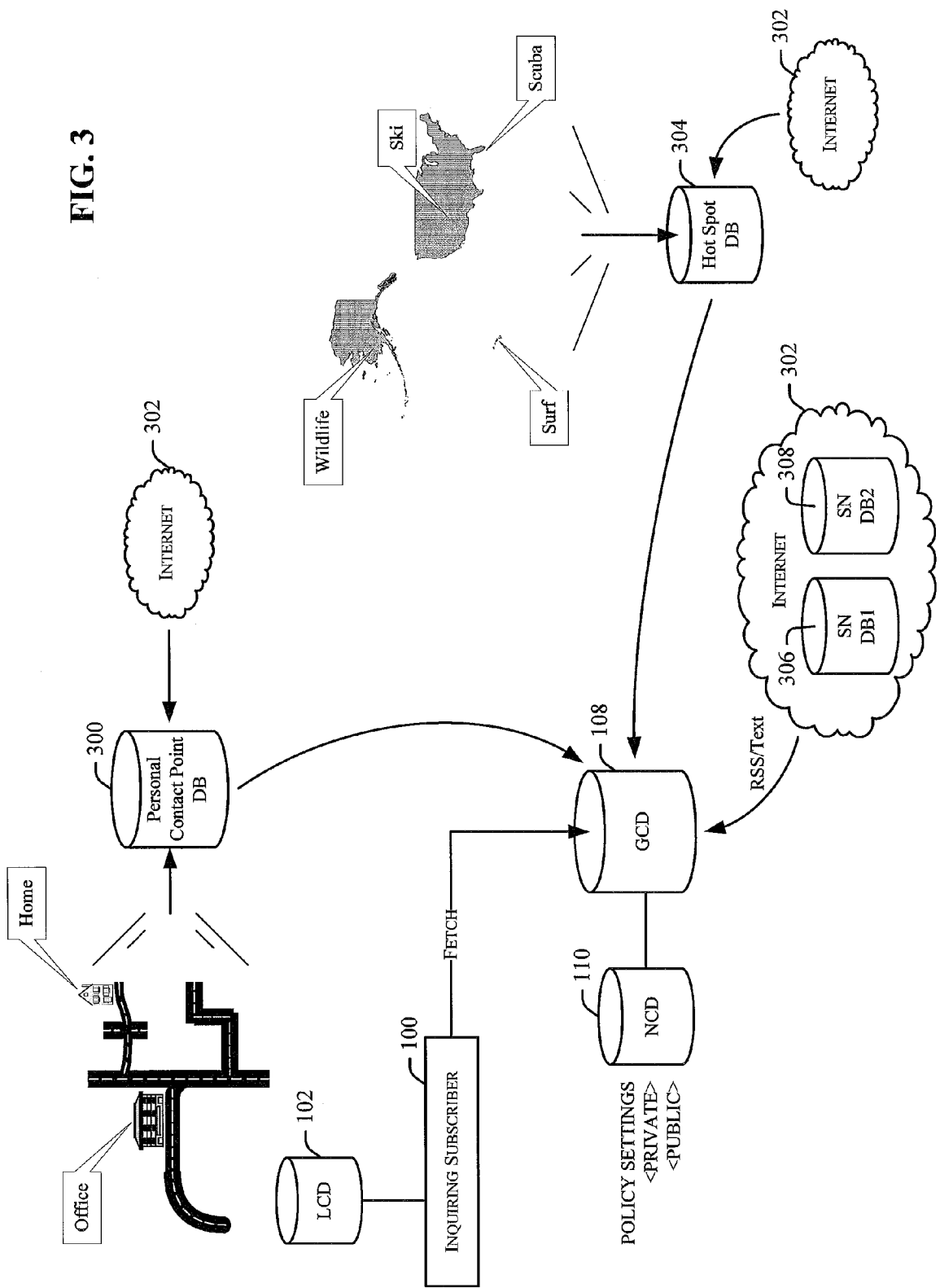
FIG. 3 is a block diagram illustrating various information sources that can provide information to the global contact database, according to the present invention.

FIG. 3 illustrates various information types that can be stored in the GCD 108 and the associated sources. By receiving information from these sources, the GCD 108 is capable of creating a more robust profile for the stored contacts. A personal contact point database (PCPD) 300 can receive user input via the Internet 302 defining one or more contact points or user-defined POI. In the illustrated embodiment, the contact points are HOME and OFFICE. The contact points may be sent to the PCPD 300 using short message service (SMS) messages. In a more robust implementation, GPS or other location determining techniques can be used to acquire location data points or a waypoint (e.g., GPS coordinates, latitude/longitude coordinates, and the like) that can be assigned contact point names, such as HOME and OFFICE in the illustrated example.

When the user becomes available at a defined contact point, the user's location is updated in the GCD 108. Referring briefly to FIG. 1, the present menu option in the second GUI menu 106 can be changed to reflect the position or contact point of Contact B. Accordingly, the new option can display HOME or OFFICE for the present location or contact point. Alternatively, as also shown in FIG. 1, the home or work location option can be selected to indicate the user is at that location without disclosing exact address information. Location updates can be manual, in the case of user-defined contact points without corresponding location data, or automatic, in the case of contact points defined by GPS or other location determining techniques, for example.

In addition to personal contact points, hot spots can be defined by hotspot identifications (<hotspot_ID>) and stored in a hot spot database (HSD) 304. As with the PCPD 300, a <hotspot_ID> can be established via the Internet 302, location determining techniques, or via alternative methods, such as SMS messages. In the illustrated embodiment, a user has defined several hotspots throughout the United States. As such, a map of the United States has <hotspot_ID> tags that briefly describe the type of hotspot. In the illustrated embodiment, a scuba diving hotspot, a skiing hotspot, a surfing hotspot, and a wildlife viewing hotspot are established for a subscriber. It should be understood that a hotspot can be defined for any POI, for example, rest stops, restaurants, gas stations, hotels, tourist attractions, amusement parks, entertainment venues, theatres, comedy clubs, parks, statues, monuments, museums, airports, and the like. A hotspot can include a generic <hotspot_ID> tag, such as in the illustrated embodiment that can define a single location or POI. The generic tag can alternatively be a headline for multiple hotspots. For example, the scuba diving hotspot tag provides a user with the general information that the selected subscriber enjoys scuba diving and, particularly, scuba diving around the Florida Keys. Additional hotspot tags can be listed underneath the headline tag for specific dive sites, for example. Additional information, such as last visited, ratings, reviews, directions, GPS coordinates, latitude and longitude coordinates, related websites, and any other information can be supplied by a subscriber to be displayed for their contacts.

Contact points and hotspots can, in some cases, be one and the same. In any case, the contact points and hotspots can be provided to an inquiring subscriber via a list or a map. When appropriate, the inquirer can choose to overlay information such that both contact points and hotspots are viewable on the same map. This information can be tied into publicly accessible mapping systems such as GOOGLE MAPS or a proprietary mapping service provided by the service provider or a third party and viewable on a mobile device or a computer, for example. For security, a user name and password can be required to access an instance of the map for the requesting subscriber. This map can include all contacts that have posted hotspot and/or contact point information. The available information can be subject to authorization requirement imposed by each contact. A group concept is also applicable, wherein subscribers that are mutual contacts can form a group with similar interests. Those within the group are free to see information posted by other group members. This can be tied in to social networking websites, web forums, web logs, and the like.

Contact points and hotspots can be policy-enabled for <public> and <private> policy settings. For example, a subscriber's home and work contact points may be <private> and some or all of the subscriber's hotspots may be <public>. Further, a generic hotspot or contact point may be <public> while a more specific hotspot may be <private>.

The GCD 108 can import data from networking website databases 306, 308. This data can be correlated with the contact point and/or hotspot data. The GCD 108 can receive updates from the social networking databases 306, 308 via RSS (real simple syndication), SMS messages, or a data connection (e.g., IP), for example.

The inquiring subscriber 100 can fetch contact information from the GCD 108 automatically or manually to update the LCD 102 (FIG. 1) with contact point, social networking, and hot spot data acquired from the respective databases 300, 304, 306, 308.

Figure 4:
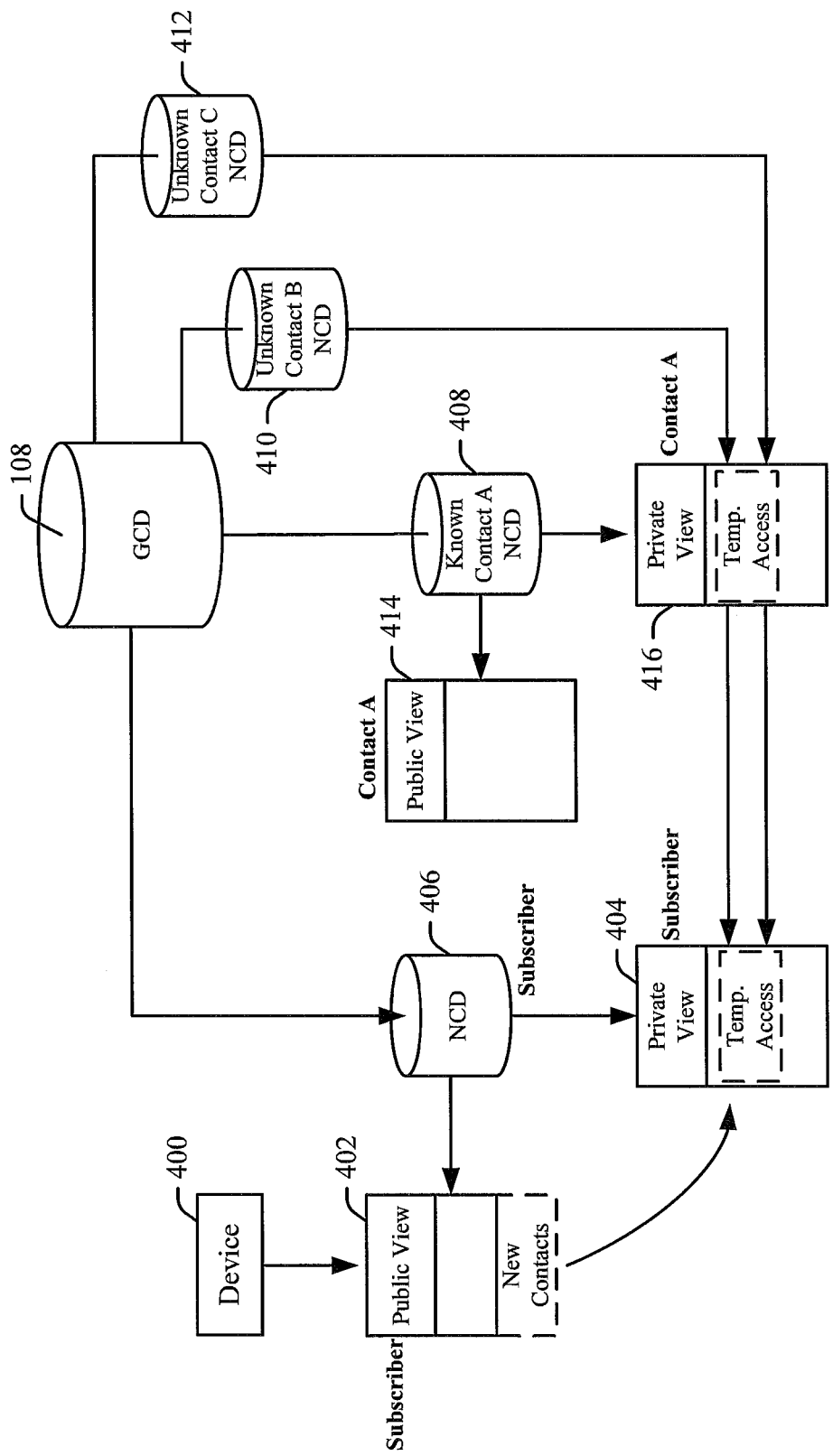
FIG. 4 is a block diagram illustrating an exemplary introduction process, according to the present invention.

Referring now to FIG. 4, an exemplary environment for the implementation of an introduction process is illustrated. An introduction function allows a subscriber to introduce two or more subscribers to each other. The illustrated embodiment includes a device 400, such as the devices illustrated and described with reference to FIG. 2. The device 400 provides a contact public view 402 and a contact private view 404 for contact information stored within the device 400 (e.g., in the LCD 102) or within an NCD 406. The subscriber's NCD 406 is in communication with the GCD 108 that, in turn, is in communication with NCDs 408, 410, 412 for contacts, both known and unknown to the subscriber. The NCDs 408, 410, 412 can alternatively be included within the GCD 108, for example, as separate database partitions or entries. Each NCD 408, 410, 412 includes a public view and a private view, for example, contact A's public view 414 and private view 416 are illustrated.

A public view can provide the subscriber with a view of all contacts currently available in the GCD 108, for example. In one embodiment, the GCD 108 includes all subscribers that subscribe to a service with a service provider. Each of these subscribers may opt-in to having a name and potentially other information published for public viewing. The public view may alternatively be every contact a subscriber knows and shares basic information with, such as name and telephone number. The private view can be reserved for trusted contacts that are authorized by the subscriber to other information. These access privileges can be defined by the subscriber on a per contact basis or globally for all contacts, specific contact lists, or groups.

In the illustrated example, the subscriber establishes a data session with contact A. Contact A is a known contact and desires to introduce contact B and contact C, whom are known only to contact A, to the subscriber. Accordingly, contact A initiates a temporary access portal between contact A's device (not shown) and the subscriber's device 400. The temporary access portal provides a view that allows the subscriber to see a contact that the subscriber does not know, but the known contact, contact A, knows and desires to introduce the subscriber to contact B and contact C. This process is called an introduction. The unknown contacts B and C can be required to authorize this action. For example, contact A can send a request to contacts B and C to introduce them to the subscriber. Assuming contacts B and C accept the request, Contact A is then authorized to communicate with the subscriber on the unknown contact's behalf. Contact A can send the subscriber a request to introduce contacts B and C. The subscriber can accept or reject the request. Assuming the subscriber accepts the request, the temporary access portal is made available and the unknown contact's information is pushed to the subscriber in the private view 404. The subscriber can then be provided the option to save the now known contact's information.

A subscriber can specify what information is to be sent during an introduction process. For example, as a default, the subscriber can elect only to allow a name and telephone number be provided in an introduction.

Figure 10:
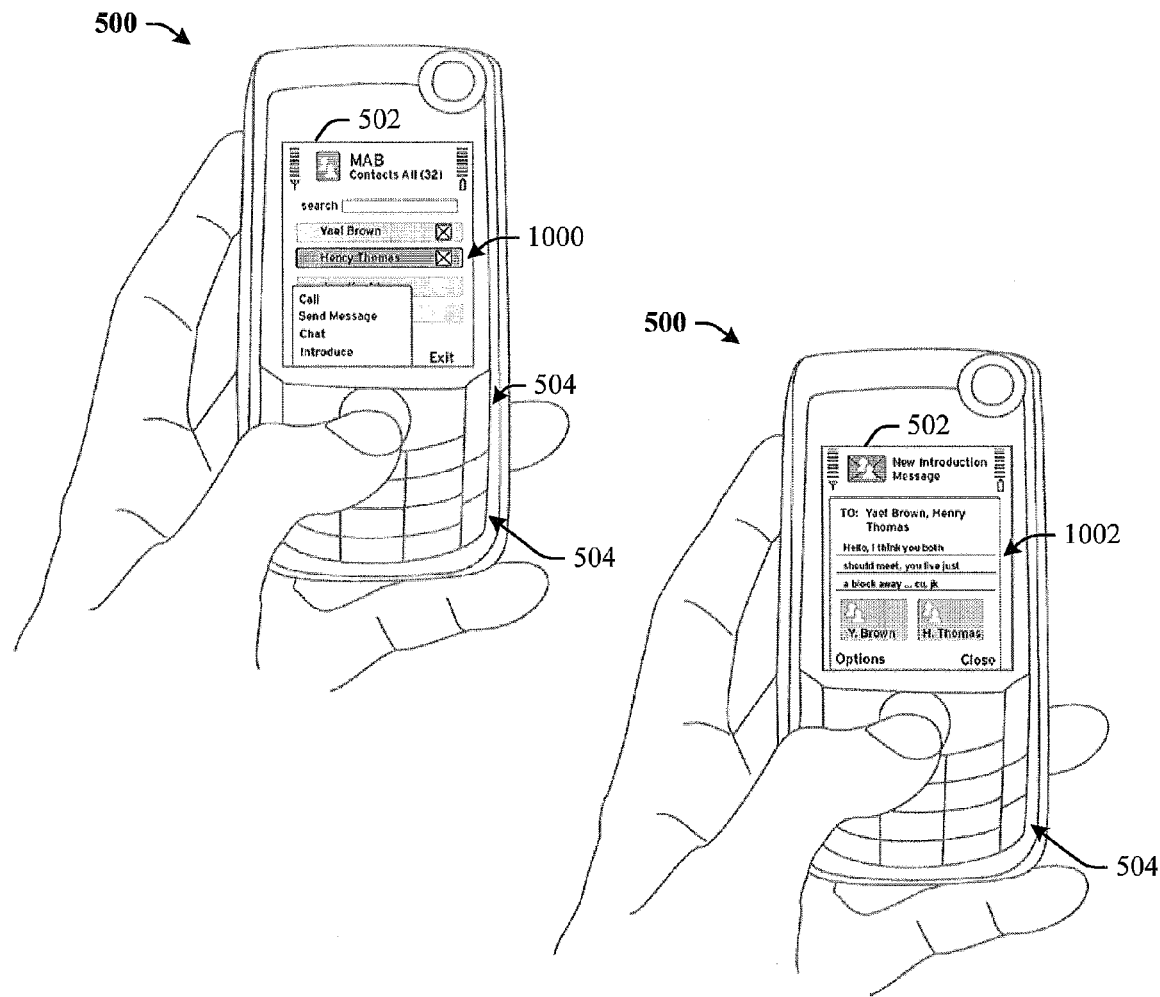
FIG. 10 is a schematic illustrating an exemplary mobile device engaged in an introduction feature, according to the present invention.

As stated above, the subscriber initiating the introduction process can send a request to the other parties. This request can be in the form of a short message or multimedia message, for example. An option can be provided for automatic generation of such a short message. The message can contain links to predetermined answers for accept or reject or can simply request a reply. FIG. 10 illustrates two examples of this feature.

Figure 5:
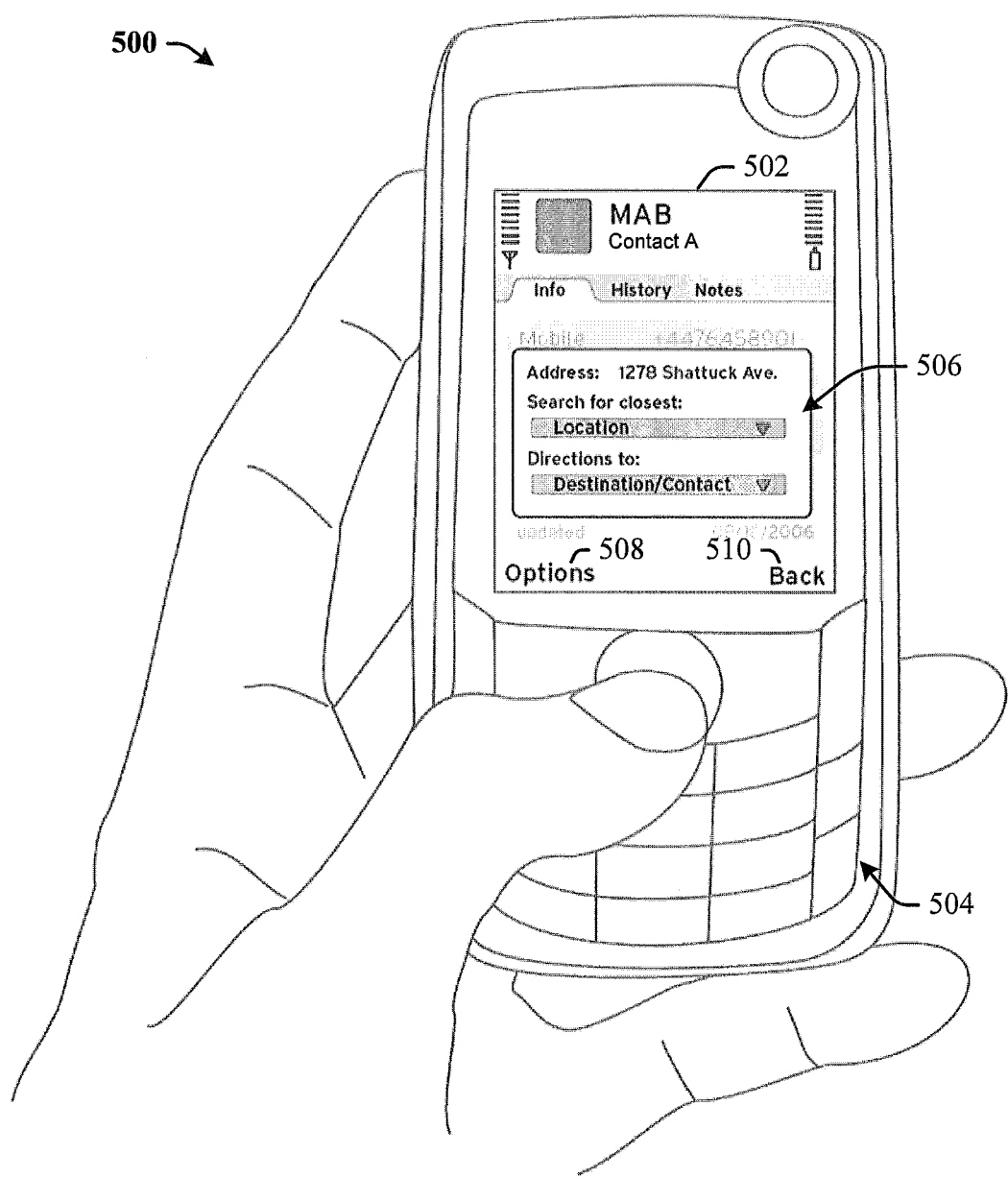
FIG. 5 is a schematic illustrating an exemplary mobile device engaged in a location search feature, according to the present invention.

FIG. 5 depicts a mobile device 500 configured in accordance with an embodiment of the present invention for providing search functions. The mobile device 500 includes a display 502. The display 502 can be any display type such as, but not limited to, a liquid crystal display (LCD), a light-emitting diode (LED) display, and a thin-film transistor (TFT) display. The mobile device 500 also includes a keypad 504. The keypad 504 can be embodied as a portion of the mobile device 500 as shown or alternatively may be a digital keypad that is at least partially displayed on display 502. As shown, soft keys 508, 510 for "options" and "back" functions, respectively, are illustrated. Other input devices such as track pads, track balls, computer mice, scroll wheels, and the like are also contemplated.

A location search prompt 506 is illustrated on the display 502. The location search prompt 506 can be configured as a selectable option under the "options" soft-key 508. The illustrated location search prompt 506 includes an address listing which presently includes contact A's home address. The address listing may be configured to obtain location information via a Global Positioning System (GPS) or other location determining method and update the present location of the contact's mobile device. This information can be obtained from the PCPDB 300 and sent to the GCD 108 in an update. In an effort to preserve privacy, a user may elect only to provide location information to certain contacts, no contacts, or all contacts. The illustrated location search prompt 506 also includes a function to allow the user to search for a closest location to the listed address. Directions to the selected location may also be provided. It is contemplated that the mobile service provider offering the services described above can be in communication with one or more third party database services to supply information regarding the closest location and directions thereto. Rating information, such as restaurant and hotel ratings can be provided to enhance the location information provided to the user. This information can be obtained from the Internet 302 by participating websites, for example. Restaurant and hotel reservation options can also be provided.

Figure 6:
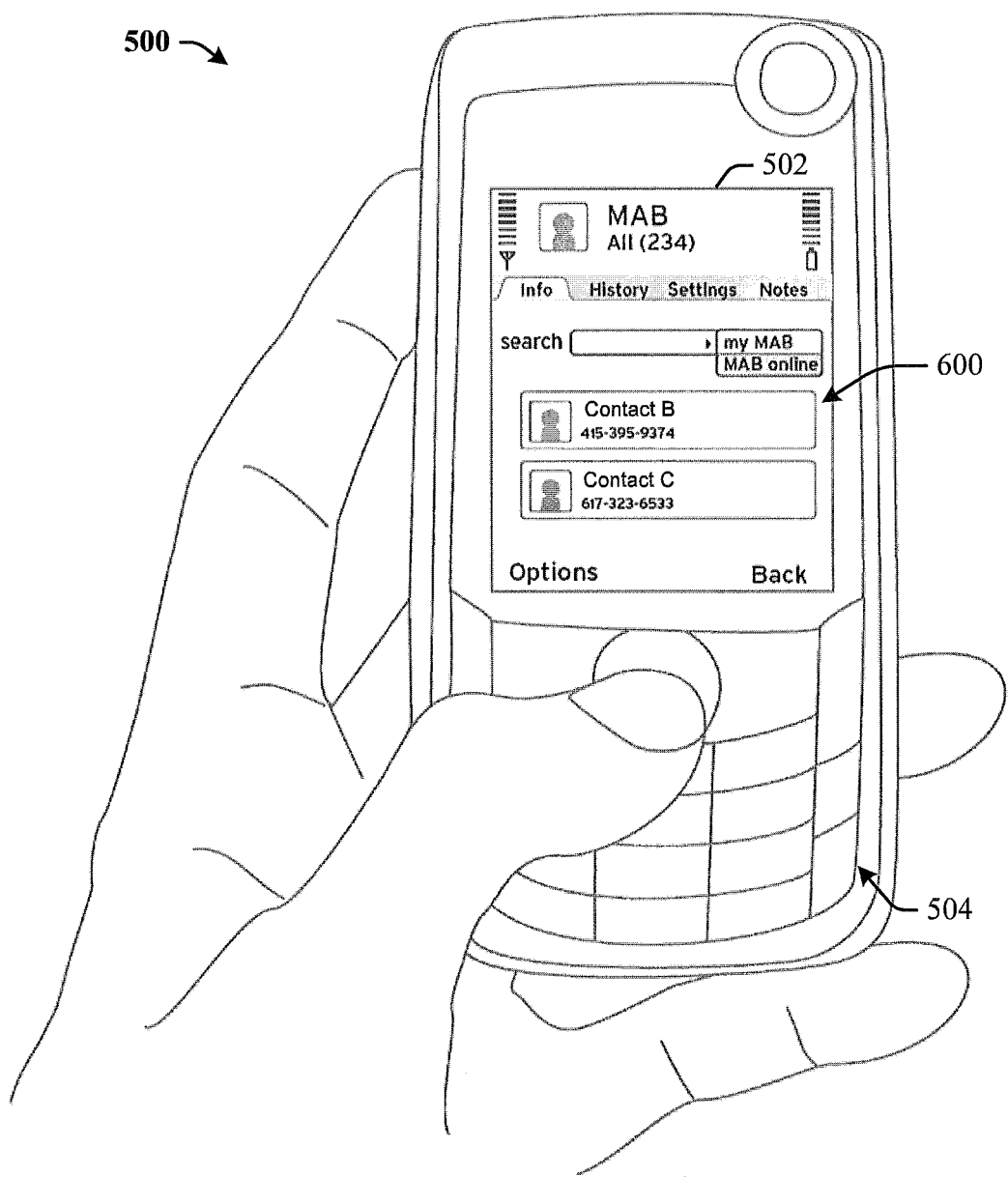
FIG. 6 is a schematic illustrating an exemplary mobile device engaged in contact search feature, according to the present invention.

FIG. 6 illustrates an example contact database or mobile address book (MAB) search screen 600. The MAB search screen 600 allows a user to search the user's MAB on the phone or the user's network database (MAB online). The latter may be useful if the user infrequently uses some contacts and would like to conserve memory space for other information. The network database may be extensible to an online database of the service provider customer base or other databases, such as white or yellow page databases, for example.

Figure 7:
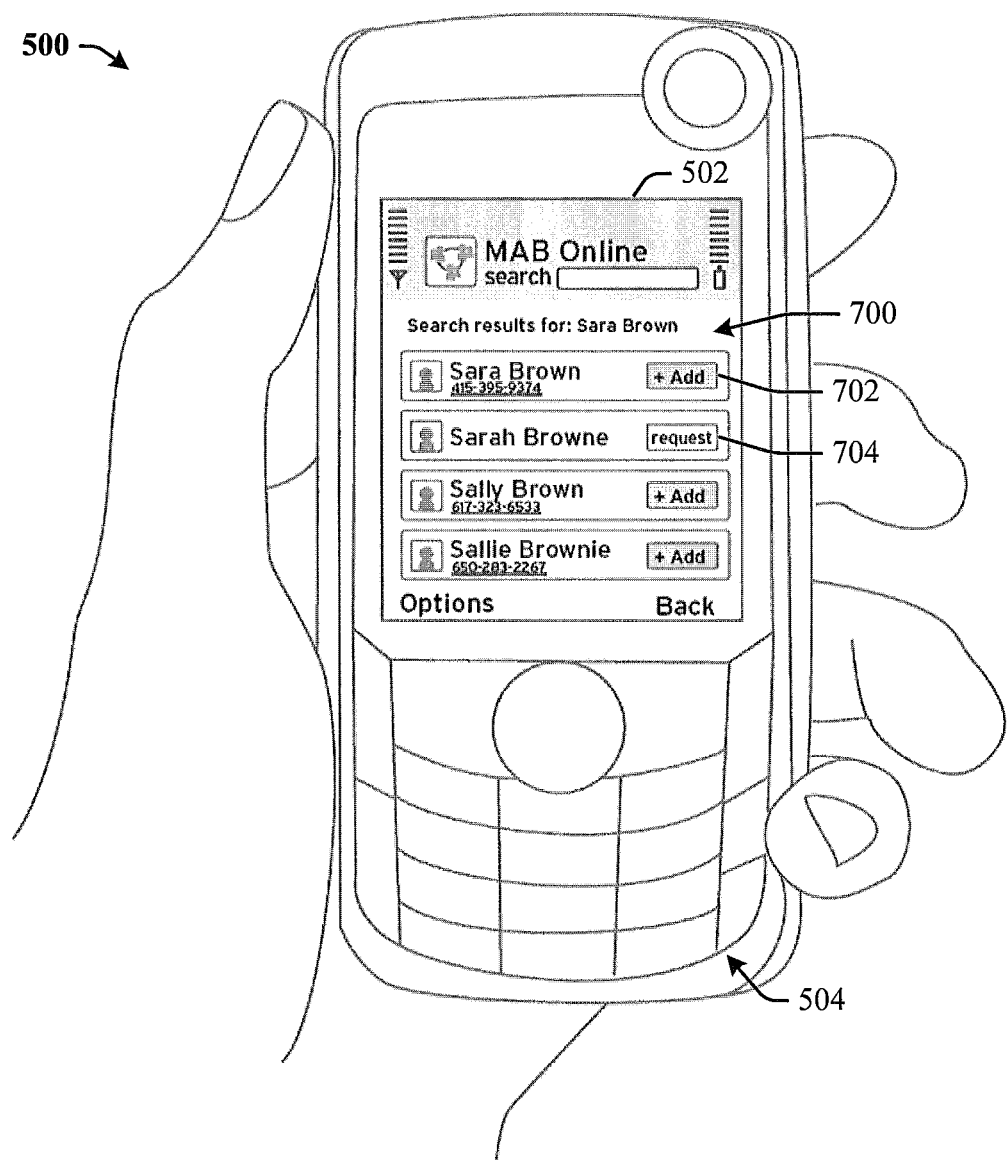
FIG. 7 is a schematic illustrating an exemplary mobile device engaged in an information request feature, according to the present invention.

FIG. 7 illustrates a MAB search results screen 700. The MAB search results screen 700 provides the search results for the requested query (see FIG. 6). An add button 702 can be provided to quickly add a contact to the user's local MAB (e.g., LCD 102) or online MAB (e.g., an NCD). The add button 702 can be made available if the contact in question in fact permits his or her information from being public. In some instances, a user may not want their information freely published in a public searchable MAB and accordingly the user may elect not to publish their contact information. In these instances, a request button 704 can be provided on the MAB search results screen 700 next to that contact. The request button 704, when activated, can generate and send a request to the associated contact. The request can be sent via an SMS message, an email message, a web posting, or a like message. A subscriber can opt out of the request option to eliminate potential spamming or unnecessary request messages. The request button 704 can also be offered only for contacts that share similar interests or that have a specified number of mutual contacts. The introduction or handshake feature described herein can also be implemented through the request button 704. For example, the request button 704 can be made available as a delayed introduction or handshake feature if a subscriber is unavailable to receive the introduction or handshake request. The subscriber can be linked to the request button to obtain the information when it is convenient instead of having to immediately answer the introduction or handshake request.

Figure 8:
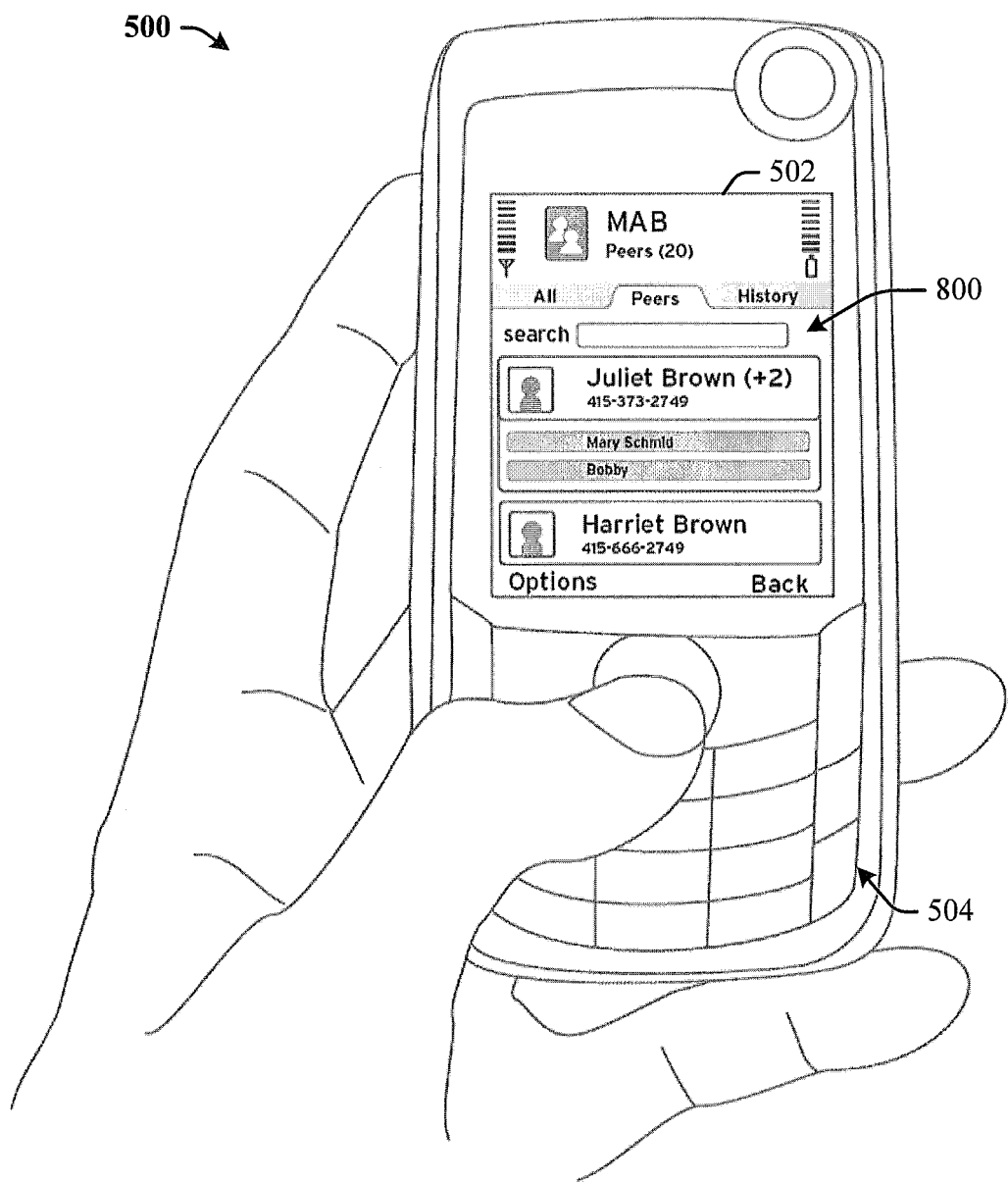
FIG. 8 is a schematic illustrating an exemplary mobile device engaged in a peer information feature, according to the present invention.

FIG. 8 illustrates a peer screen 800. The peer screen 800 allows a user to view contacts affiliated with other contacts. In the illustrated example, the contact Juliet Brown has two peers as indicated to the right of her name. The two peers are listed beneath her name. It is contemplated that the aforementioned functionality could be configured for use with a social networking website to retrieve affiliated contact information. The peer screen 800 is also applicable to subscriber groups, wherein each member of a group or at least a group header can be included beneath each contacts name to identify the group (s) the subscriber belongs to or is somehow associated with and, potentially, the members of the group.

Figure 9:
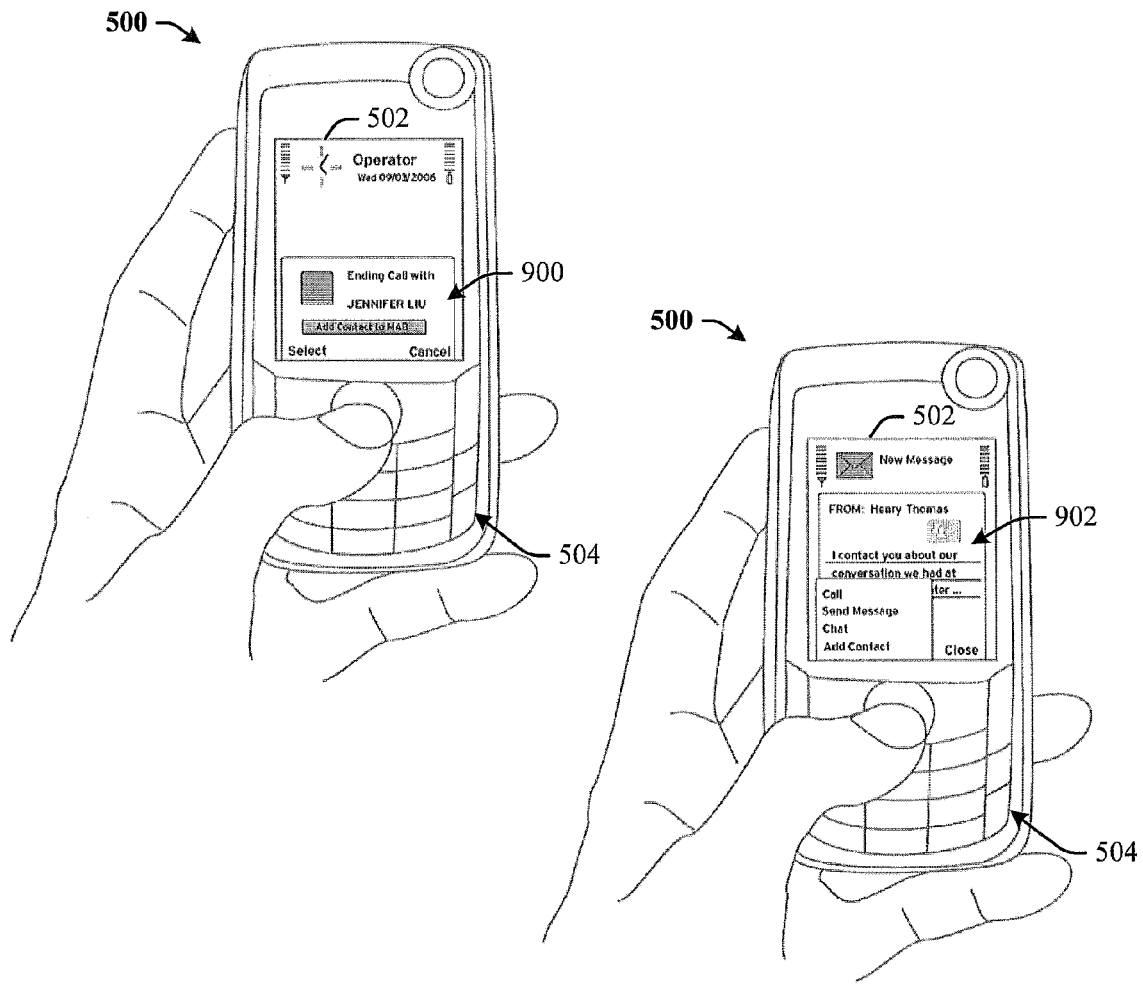
FIG. 9 is a schematic illustrating an exemplary mobile device engaged in two handshake features, according to the present invention.

FIG. 9 illustrates two example handshake screens 900, 902. A handshake function allows a subscriber to exchange contact information with another subscriber. In a handshake function each of the subscribers are not privy to each others information prior to the completion of a handshake function. The first handshake screen 900 allows a user to add contact information for a new contact at the end of a voice call. The second handshake screen 902 allows a user to add contact information for a new contact as an option after receipt of a text message. The illustrated handshake screens 900, 902 identify the contact's name and provide an option for the recipient to add the contact name, telephone number, and/or address to the recipient contact list.

FIG. 10 illustrates a contact introduction screen 1000. The contact introduction screen 1000 allows a user to introduce two or more contacts to each other by selecting each contact the user desires to introduce. As illustrated, the user can select an introduce option under the "options" soft-key 508. An introduction message 1002 can be generated and sent to the selected contacts. The message sent can be pre-defined such as selected from a group of pre-defined messages or customized by the user. As an alternative, the introduce option can be available during a communication session such that the user could select this option to send his contact information to the other person during the communication session.

The contact information sent to a subscriber can include embedded information, such as the introduce, the date the contact was added, and the date the contact's information was updated, for example. This information can be updated automatically with the introduction message. Alternatively, these fields can be updated or modified by the user. This feature can be toggled ON/OFF as desired by the user.

FIG. 11 illustrates a schematic block diagram illustrating an exemplary mobile communications device 500 for use in accordance with an exemplary embodiment of the present invention. Although no connections are shown between the components illustrated and described in FIG. 11, the components can interact with each other to carry out device functions.

As illustrated, the mobile communications device 500 can be a multimode handset. FIG. 11 and the following discussion are intended to provide a brief, general description of a suitable environment in which the various aspects of an embodiment of the present invention can be implemented. While the description includes a general context of computer-executable instructions, the present invention can also be implemented in combination with other program modules and/or as a combination of hardware and software.

Generally, applications can include routines, program modules, programs, components, data structures, and the like. Applications can be implemented on various system configurations, including single-processor or multiprocessor systems, minicomputers, mainframe computers, personal computers, hand-held computing devices, microprocessor-based, programmable consumer electronics, combinations thereof, and the like.

The device 500 includes a display 1100 for displaying multimedia such as, for example, text, images, video, telephony functions, such as, visual voicemail data, caller line ID data, setup functions, menus, music metadata, messages, wallpaper, graphics, and the like. The device 500 also includes a processor 1102 for controlling, and/or processing data. A memory 1104 can interface with the processor 1102 for the storage of data and/or applications 1106. The memory 1104 can include a variety of computer readable media, including volatile media, non-volatile media, removable media, and non-removable media. Computer-readable media can include device storage media and communication media. Storage media can include volatile and/or non-volatile, removable and/or non-removable media such as, for example, random access memory (RAM), read-only memory (ROM), electrically erasable programmable ROM (EEPROM), flash memory or other memory technology, compact disc (CD), ROM, digital versatile disc or digital video disc (DVD), or other optical disk storage, magnetic tape, magnetic disk storage or other magnetic storage devices, or any other medium that can be used to store the desired information and that can be accessed by the device 500.

The memory 1104 can be configured to store one or more applications 1106, such as, for example, video player software, user feedback component software, combinations thereof, and the like. The applications 1106 can also include a user interface (UI) application 1108. The UI application 1108 can interface with a client 1110 (e.g., an operating system) to facilitate user interaction with device functionality and data, for example, answering/initiating calls, entering/deleting data, configuring settings, address book manipulation, multimode interaction, and the like. The applications 1106 can include other applications 1112 such as, for example, visual voicemail software, add-ons, plug-ins, voice recognition software, call voice processing, voice recording, messaging, e-mail processing, video processing, image processing, music play, combinations thereof, and the like, as well as subsystems and/or components. The applications 1006 can be stored in the memory 1104 and/or in a firmware 1114, and can be executed by the processor 1102. The firmware 1114 can also store code for execution during initialization of the device 500.

A communications component 1116 can interface with the processor 1102 to facilitate wired/wireless communications with external systems including, for example, cellular networks, VoIP networks, local area network (LAN), wide area network (WAN), metropolitan area network (MAN), personal area network (PAN), that can be implemented using WIFI, WIMAX, combinations and/or improvements thereof, and the like. The communications component 1116 can also include a multimode communications subsystem for providing cellular communications via different cellular technologies. For example, a first cellular transceiver 1118 can operate in one mode, for example, GSM, and an Nth transceiver 1120 can operate in a different mode, for example WIFI. While only two transceivers 1118, 1120 are illustrated, it should be appreciated that a plurality of transceivers can be included. The communications component 1116 can also include a transceiver 1122 for unlicensed RF communications using technology such as, for example, WIFI, WIMAX, near field communications (NFC), other radio frequency (RF) and the like. The transceiver 1122 can also be configured for line-of-sight technologies, such as, infrared and infrared data association IRDA, for example. Although a single transceiver 1122 is illustrated multiple transceivers for unlicensed RF and line-of-sight technologies are contemplated.

The communications component 1116 can also facilitate communications reception from terrestrial radio networks, digital satellite radio networks, Internet-based radio services networks, combinations thereof, and the like. The communications component 1116 can process data from a network, such as, for example, the Internet, a corporate intranet, a home broadband network, and the like, via an ISP, DSL provider, or other broadband service provider.

An input/output (I/O) interface 1124 can be provided for input/output of data and/or signals. The I/O interface 1124 can be a hardwire connection, such as, for example, a USB, PS2, IEEE 1394, serial, parallel, IEEE 802.3 (e.g., Ethernet—RJ45, RJ48), traditional telephone jack (e.g., RJ11, RJ14, RJ25) and the like, and can accept other I/O devices, such as, for example, a keyboard, keypad, mouse, interface tether, stylus pen, printer, plotter, jump/thumb drive, touch screen, touch pad, trackball, joy stick, controller, monitor, display, LCD, combinations thereof, and the like.

Audio capabilities can be provided by an audio I/O component 1126 that can include a speaker (not shown) for the output of audio signals and a microphone (not shown) to collect audio signals.

The device 500 can include a slot interface 1128 for accommodating a subscriber identity system 1130, such as, for example, a SIM or universal SIM (USIM). The subscriber identity system 1130 instead can be manufactured into the device 500, thereby obviating the need for a slot interface 1128.

The device 500 can include an image capture and processing system 1132. Photos and/or videos can be obtained via an associated image capture subsystem of the image system 1132, for example, a camera. The device 500 can also include a video systems component 1134 for processing, recording, and/or transmitting video content.

A location component 1136 can be included to send and/or receive signals, such as, for example, GPS data, assisted GPS data, triangulation data, combinations thereof, and the like. The device 500 can use the received data to identify its location or can transmit data used by other devices to determine the device 500 location. The location information can be uploaded to one or more databases accessible by the GCD 108.

The device 500 can include a power source 1138 such as batteries and/or other power subsystem (AC or DC). The power source 1138 can be single-use, continuous, or rechargeable. In the case of the latter, the power source 1138 can interface with an external power system or charging equipment via a power I/O component 1140.

The law does not require and it is economically prohibitive to illustrate and teach every possible embodiment of the present claims. Hence, the above-described embodiments are merely exemplary illustrations of implementations set forth for a clear understanding of the principles of the invention. Variations, modifications, and combinations may be made to the above-described embodiments without departing from the scope of the claims. All such variations, modifications, and combinations are included herein by the scope of this disclosure and the following claims.

What is claimed is:

1. A system for providing contact information to a plurality of subscribers in a communications network via communications devices, the system comprising:

a global contact database that stores first basic contact information for a first subscriber and second basic contact information for a second subscriber, the first basic contact information and the second basic contact information comprising name information for the first subscriber and the second subscriber, respectively, address information for the first subscriber and the second subscriber, respectively, email address information for the first subscriber and the second subscriber, respectively and telephone number information for the first subscriber and the second subscriber, respectively;

an auxiliary contact database in communication with the global contact database, wherein the auxiliary contact database stores first advanced contact information for the first subscriber and second advanced contact information for the second subscriber received from a data source and provides the first advanced contact information and the second advanced contact information to the global contact database in response to a request from the global contact database;

a plurality of first communications devices associated with the first subscriber, the plurality of first communications devices in communication with the global contact database via the communications network, wherein each of the plurality of first communications devices comprises a first local contact database that stores the second basic contact information for the second subscriber and the second advanced contact information for the second subscriber received from the global contact database; and a second communications device associated with the second subscriber, the second communications device in communication with the global contact database via the communications network, wherein the second communications device comprises a second local contact database that stores the first basic contact information for the first subscriber and the first advanced contact information for the first subscriber received from the global contact database, wherein the first advanced contact information for the first subscriber stored by the second local contact database comprises an identification indicating a first communications device of the plurality of first communications devices associated with the first subscriber that is being used by the first subscriber, wherein the first communications device of the plurality of first communications devices associated with the first subscriber that is being used by the first subscriber is associated with a registered attribute and an active attribute, while each the plurality of the first communications devices associated with the first subscriber other than the first communications device is only associated with the registered attribute, wherein the first advanced contact information comprises hot spot identification information comprising a hot spot associated with the first subscriber, and wherein the hot spot identification information is provided to the second communications device via a map identifying the hot spot.

2. The system of claim 1, wherein the first advanced contact information for the first subscriber further comprises a location of the first subscriber.

3. The system of claim 1, wherein the first advanced contact information further comprises personal contact point information associated with the first subscriber.

4. The system of claim 1, wherein the first advanced contact information further comprises social networking information associated with the first subscriber.

5. The system of claim 1, wherein the first advanced contact information further comprises group association information associated with the first subscriber.

6. The system of claim 1, wherein the first advanced contact information further comprises policy settings for private and public contact information associated with the first subscriber.

7. A first communications device associated with a first subscriber for providing contact information, the first communications device comprising:
  a processor; and
  a memory that stores instructions that, when executed by the processor, cause the processor to perform operations comprising
  receiving, from a global contact database, second basic contact information for a second subscriber associated with a plurality of second communications devices, the second basic contact information comprising name information for the second subscriber, address information for the second subscriber, email address information for the second subscriber, and telephone number information for the second subscriber, wherein the global contact database stores first basic contact information for the first subscriber, the first basic contact information comprising name information for the first subscriber, address information for the first subscriber, email address information for the first subscriber, and telephone number information for the first subscriber,
  receiving, from the global contact database, second advanced contact information for the second subscriber associated with the plurality of second communications devices, wherein the global contact database receives the second advanced contact information from an auxiliary contact database and wherein the auxiliary contact database stores first advanced contact information for the first subscriber,
  storing the second basic contact information and the second advanced contact information at a first local contact database of the first communications device, wherein each of the plurality of second communications devices associated with the second subscriber comprises a second local contact database that stores the first basic contact information for the first subscriber and the first advanced contact information for the first subscriber,
  generating a first menu comprising the second subscriber,
  receiving a selection of the second subscriber from the first menu,
  in response to receiving the selection of the second subscriber from the first menu, providing a second menu comprising the second advanced contact information for the second subscriber, the second advanced contact information for the second subscriber comprising an identification indicating a second communications device of the plurality of second communications devices associated with the second subscriber that is being used by the subscriber, wherein the second communications device of the plurality of second communications devices associated with the second subscriber that is being used by the second subscriber is associated with a registered attribute and an active attribute, while each of the plurality of the second communications devices associated with the second subscriber other than the second communications device is only associated with the registered attribute,
  wherein the second advanced contact information for the second subscriber further comprises hot spot identification information comprising a hot spot associated with the second subscriber, and
  providing the hot spot identification information to the first communications device via a map identifying the hot spot.

8. The communications device of claim 7, wherein the second advanced contact information for the second subscriber further comprises personal contact point information associated with the second subscriber.

9. The communications device of claim 7, wherein the second advanced contact information for the second subscriber further comprises social networking information associated with the second subscriber.

10. The communications device of claim 7, wherein the second advanced contact information for the second subscriber further comprises policy settings for private and public contact information associated with the second subscriber.

11. A non-transitory computer-readable storage medium storing instruction that, when executed by a processor of a first communications device associated with a first subscriber, cause the processor to perform operations comprising:

receiving, from a global contact database, second basic contact information for a second subscriber associated with a plurality of second communications devices, the second basic contact information comprising name information for the second subscriber, address information for the second subscriber, email address information for the second subscriber, and telephone number information for the second subscriber, wherein the global contact database stores first basic contact information for the first subscriber, the first basic contact information comprising name information for the first subscriber, address information for the first subscriber, email address information for the first subscriber, and telephone number information for the first subscriber;

receiving, from the global contact database, second advanced contact information for the second subscriber associated with the plurality of second communications devices, wherein the global contact database receives the second advanced contact information from an auxiliary contact database and wherein the auxiliary contact database stores first advanced contact information for the first subscriber;

storing the second basic contact information and the second advanced contact information at a first local contact database of the first communications device, wherein each of the plurality of second communications devices associated with the second subscriber comprises a second local contact database that stores the first basic contact information for the first subscriber and the first advanced contact information for the first subscriber;

generating a first menu comprising the second subscriber;

receiving a selection of the second subscriber from the first menu;

in response to receiving the selection of the second subscriber from the first menu, providing a second menu comprising the second advanced contact information for the second subscriber, the second advanced contact information for the second subscriber comprising an identification indicating a second communications device of the plurality of second communications devices associated with the second subscriber that is being used by the subscriber, wherein the second communications device of the plurality of second communications devices associated with the second subscriber that is being used by the second subscriber is associated with a registered attribute and an active attribute, while each of the plurality of the second communications devices associated with the second subscriber other than the second communications device is only associated with the registered attribute, wherein the second advanced contact information for the second subscriber comprises hot spot identification information comprising a hot spot associated with the second subscriber; and providing the hot spot identification information to the first communications device via a map identifying the hot spot.

12. The non-transitory computer-readable storage medium of claim 11, wherein the second advanced contact information for the second subscriber further comprises personal contact point information associated with the second subscriber.

13. The non-transitory computer-readable storage medium of claim 11, wherein the second advanced contact information for the second subscriber further comprises social networking information associated with the second subscriber.

14. The non-transitory computer-readable storage medium of claim 11, wherein the second advanced contact information for the second subscriber further comprises group association information associated with the second subscriber.

15. The non-transitory computer-readable storage medium of claim 11, wherein the second advanced contact information for the second subscriber further comprises policy settings for private and public contact information associated with the second subscriber.

* * * * *